United States Patent
Yamarthi et al.

(10) Patent No.: US 12,313,006 B1
(45) Date of Patent: May 27, 2025

(54) TURBINE ENGINE INCLUDING AN AIR TURBINE STARTER

(71) Applicant: Unison Industries, LLC, Jacksonville, FL (US)

(72) Inventors: David Raju Yamarthi, Bengaluru (IN); Ravindra Shankar Ganiger, Bengaluru (IN); Sheo Narain Giri, Bengaluru (IN); Nagendra Baddam, Bengaluru (IN); Saurya Ranjan Ray, Bengaluru (IN); John Carl Glessner, Kings Mills, OH (US); Shiloh Montegomery Meyers, Miamisburg, OH (US); Brian Christopher Kemp, Troy, OH (US)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 18/523,156

(22) Filed: Nov. 29, 2023

(51) Int. Cl.
*F02C 7/277* (2006.01)
*F02C 7/268* (2006.01)
*F02C 7/27* (2006.01)

(52) U.S. Cl.
CPC .............. *F02C 7/27* (2013.01); *F02C 7/268* (2013.01)

(58) Field of Classification Search
CPC .......... F02C 7/277; F02C 7/268; F02C 7/275; F01D 21/06; F01D 25/34
See application file for complete search history.

(56) References Cited

U.S. PATENT DOCUMENTS

| | | | |
|---|---|---|---|
| 5,114,103 A | 5/1992 | Coffinberry | |
| 5,237,815 A | 8/1993 | McArthur | |
| 6,684,898 B2 | 2/2004 | Wiggins et al. | |
| 9,664,070 B1* | 5/2017 | Clauson | F02C 7/277 |
| 10,040,577 B2 | 8/2018 | Teicholz et al. | |
| 10,309,317 B2 | 6/2019 | Pech et al. | |
| 10,634,057 B2 | 4/2020 | Kelly et al. | |
| 10,711,700 B2 | 7/2020 | Greenberg et al. | |
| 2017/0234235 A1* | 8/2017 | Pech | F02C 7/36 290/31 |
| 2017/0234237 A1 | 8/2017 | Pech et al. | |
| 2017/0335772 A1* | 11/2017 | Coldwate | F02C 9/00 |
| 2017/0356457 A1* | 12/2017 | Rasmussen | B64D 27/10 |
| 2018/0030900 A1* | 2/2018 | Mathis | F02C 7/277 |
| 2018/0112600 A1 | 4/2018 | Kelly et al. | |
| 2019/0383220 A1* | 12/2019 | Mackin | F02C 7/277 |
| 2022/0161932 A1* | 5/2022 | Sharpe | B64D 13/02 |

FOREIGN PATENT DOCUMENTS

EP 3351743 B1 6/2022

* cited by examiner

*Primary Examiner* — Gerald L Sung
(74) *Attorney, Agent, or Firm* — McGarry Bair PC

(57) ABSTRACT

A turbine engine having an engine core having a compression section, combustion section, a turbine section, and an engine drive shaft. The turbine engine includes an air turbine starter having a housing defining an air flow passage. The air turbine starter can operate in a start-up mode and a shut-down mode. The turbine engine further includes a gearbox and a drive unit.

14 Claims, 5 Drawing Sheets

TURBINE ENGINE INCLUDING AN AIR TURBINE STARTER

TECHNICAL FIELD

The disclosure generally relates to a turbine engine, more specifically, to a turbine engine including an air turbine starter.

BACKGROUND

A turbine engine, for example a gas turbine engine, is typically started via an air turbine starter (ATS). The ATS is often mounted near the turbine engine and the ATS can be coupled to a high-pressure fluid source, such as compressed air, which impinges upon a turbine rotor in the ATS causing it to rotate at a relatively high rate of speed. The ATS includes an output drive shaft that is driven by the turbine rotor, typically through a reducing gearbox, where the output drive shaft provides rotational energy to a rotatable element of the turbine engine (e.g., the crankshaft or the rotatable shaft) to begin rotating. The rotation by the ATS continues until the turbine engine attains a self-sustaining operating rotational speed.

BRIEF DESCRIPTION OF THE DRAWINGS

A full and enabling disclosure of the present subject matter, including the best mode thereof, directed to one of ordinary skill in the art, is set forth in the specification, which makes reference to the appended Figs., in which.

DETAILED DESCRIPTION

Figure 1:
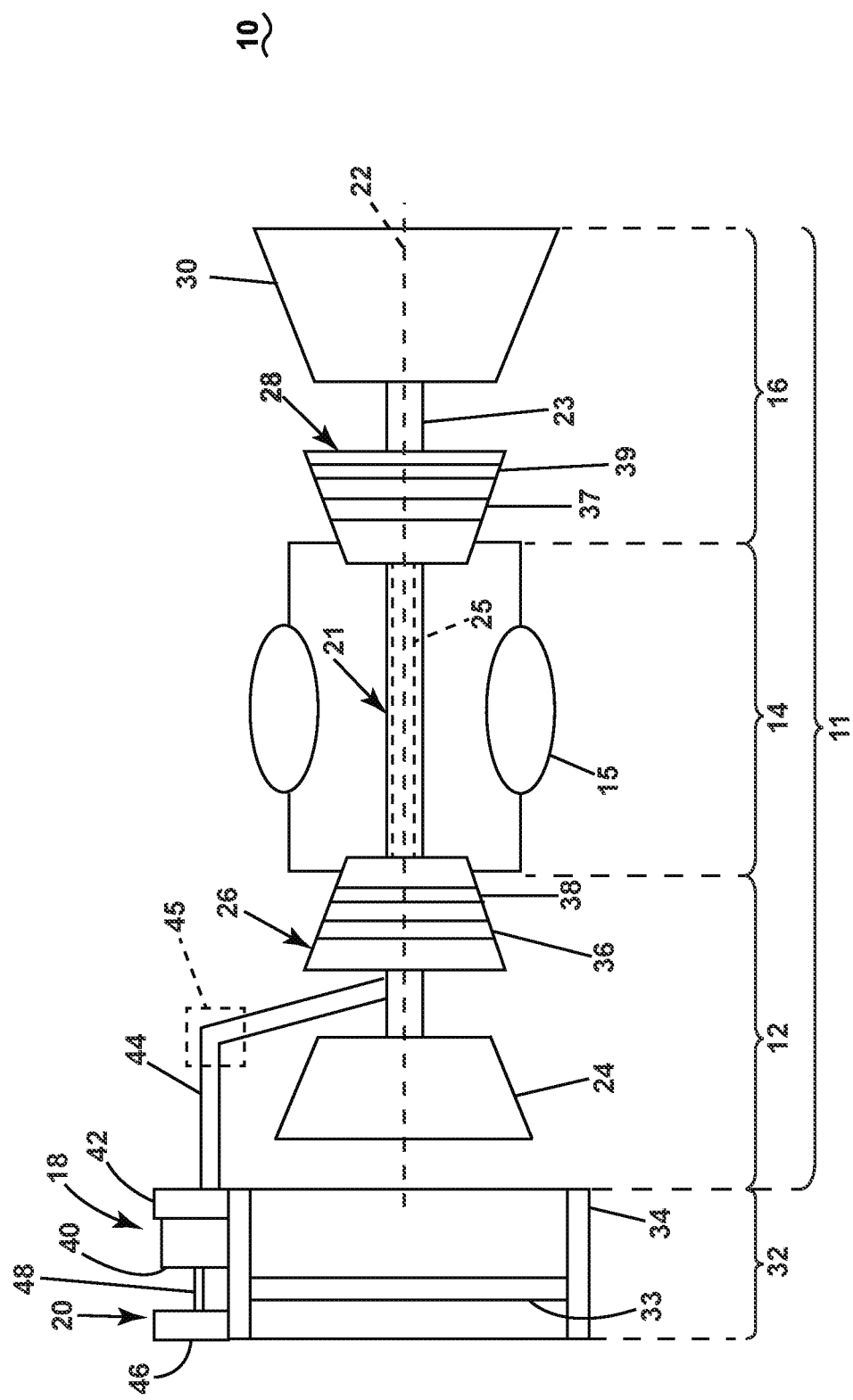
FIG. 1 is a schematic of a turbine engine with an air turbine starter assembly and a drive unit, in accordance with various aspects described herein.

Aspects of the present disclosure are directed to a turbine engine having an air turbine starter (ATS) that interfaces or is included in an air turbine starter assembly and a drive unit. The ATS is a bi-direction ATS flowing air in a first direction from a first opening to a second opening during start-up of the turbine engine and flowing air in a second direction when the turbine engine is shutting-off, off, or during maintenance of the turbine engine.

While in start-up mode, pressurized air flows in the first direction over at least one set of vanes and a turbine in the ATS which rotates an ATS drive shaft. The rotational energy from the ATS drive shaft is provided to an engine drive shaft. The ATS continues to provide a rotational output to the engine drive shaft until the turbine engine is self-sustaining; at which point the ATS is selectively disengaged or uncoupled from the engine drive shaft. The selective coupling of the ATS and the engine drive shaft can be accomplished by an accessory gearbox.

During shut-down of the turbine engine or during maintenance of the turbine engine, the drive unit is selectively coupled to the ATS. The drive unit includes a power source (e.g., an electric motor) that can rotatably drive the ATS drive shaft in a direction opposite that of start-up. The turbine in the ATS, being rotated by the drive unit, draws in air to the ATS through the second opening. The air flows in a second direction over the turbine and at least one set of vanes in the ATS and exits the ATS as compressed air at the first opening.

The compressed air provided at the first opening can be supplied to one or more portions of the turbine engine. More specifically, the compressed air can be provided to one or more portions of an engine core of the turbine engine. The compressed air can be used to rotate one or more portions of the engine core. Rotation of one or more portions of the turbine engine during shut down can draw ambient air through the engine core; cooling the core. Further, rotation of one or more portions of the turbine engine can allow maintenance of the engine without starting the engine or requiring additional equipment be connected to the turbine engine to rotate the one or more portions.

For purposes of illustration, the present disclosure will be described with respect to an engine starter assembly for a turbine engine. It will be understood, however, that aspects of the disclosure described herein are not so limited and can have general applicability for other engines or other turbine engines. For example, the disclosure can have applicability for an engine starter assembly used with any suitable engine or within any suitable vehicle, and can be used to provide benefits in industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", "third", "fourth", etc. may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction extending towards or away from a common center. For example, in the overall context of a turbine engine, radial refers to a direction along a ray extending between a center longitudinal axis of the turbine engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, fastened, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, a "controller" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The exemplary drawings are for purposes of illustration only and the dimensions, positions, order and relative sizes reflected in the drawings attached hereto can vary.

FIG. 1 is a schematic view of a turbine engine 10. As a non-limiting example, the turbine engine 10 can be used within an aircraft. The turbine engine 10 includes an engine core 11 having, at least in serial flow arrangement, a compression section 12, a combustion section 14 having at least one combustor 15, a turbine section 16, and an engine drive shaft 21. The turbine engine 10 further includes an air turbine starter assembly 18 and a drive unit 20. The engine drive shaft 21 rotationally couples the compression section 12 and the turbine section 16, such that rotation of one affects the rotation of the other, and defines a rotational axis or a centerline 22 for the turbine engine 10.

The compression section 12 can include a low-pressure (LP) compressor 24, and a high-pressure (HP) compressor 26 serially fluidly coupled to one another. The turbine section 16 can include a high-pressure (HP) turbine 28, and a low-pressure (LP) turbine 30 serially fluidly coupled to one another. The engine drive shaft 21 can operatively couple the LP compressor 24, the HP compressor 26, the LP turbine 30, and the HP turbine 28 together. Alternatively, the engine drive shaft 21 can be a drive shaft assembly including multiple drive shafts such as an LP drive shaft 23 and an HP drive shaft 25. The LP drive shaft 23 can couple the LP compressor 24 to the LP turbine 30, and the HP drive shaft 25 can couple the HP compressor 26 to the HP turbine 28.

An LP spool can be defined as the combination of the LP compressor 24, the LP turbine 30, and the LP drive shaft 23 such that the rotation of the LP turbine 30 can apply a driving force to the LP drive shaft 23, which in turn can rotate the LP compressor 24. An HP spool can be defined as the combination of the HP compressor 26, the HP turbine 28, and the HP drive shaft 25 such that the rotation of the HP turbine 28 can apply a driving force to the HP drive shaft 25 which in turn can rotate the HP compressor 26.

The compression section 12 can include a plurality of axially spaced stages. That is, the LP compressor 24 and the HP compressor 26 can include a plurality of axially spaced stages. Each stage includes a set of circumferentially spaced rotating blades and a set of circumferentially spaced stationary vanes. A stage in the HP compressor 26 is illustrated, by way of example, as a set of circumferentially spaced vanes 36 and a set of circumferentially spaced blades 38.

The set of circumferentially spaced blades 38 for a stage of the compression section 12 can be mounted to a disk, which is mounted to the engine drive shaft 21. The set of circumferentially spaced blades 38 for a given stage can have its own disk. The set of circumferentially spaced vanes 36 of the compression section 12 can be mounted to a casing which can extend circumferentially about the turbine engine 10. It will be appreciated that the representation of the compression section 12 is merely schematic and that there can be any number of stages. Further, it is contemplated that there can be any other number of components within the compression section 12.

Similar to the compression section 12, the turbine section 16 can include a plurality of axially spaced stages, where a stage in the HP turbine 28 is illustrated, by way of example, as a set of circumferentially spaced vanes 37 and a set of circumferentially spaced blades 39.

The set of circumferentially spaced blades 39 for a stage of the turbine section 16 can be mounted to a disk which is mounted to the engine drive shaft 21. The set of circumferentially spaced blades 39 for a given stage can have its own disk. The set of circumferentially spaced vanes 37 of the turbine section 16 can be mounted to the casing in a circumferential and stationary manner. It is noted that there can be any number of blades, vanes, and turbine stages, as the illustrated turbine section is merely a schematic representation. Further, it is contemplated, that there can be any other number of components within the turbine section 16.

The combustion section 14 can be provided serially between the compression section 12 and the turbine section 16. The combustion section 14 can be fluidly coupled to at least a portion of the compression section 12 and the turbine section 16 such that the combustion section 14 at least partially fluidly couples the compression section 12 to the turbine section 16. As a non-limiting example, the combustion section 14 can be fluidly coupled to the HP compressor 26 at an upstream end of the combustion section 14 and to the HP turbine 28 at a downstream end of the combustion section 14.

Optionally, a fan section 32 can be located upstream of the compression section 12, and more specifically, upstream of the LP compressor 24. The fan section 32 can include a fan casing 34 circumscribing a fan 33. The fan 33 can be driven by the engine drive shaft 21; more specifically, the LP drive shaft 23.

The air turbine starter assembly 18 can include an air turbine starter (ATS) 40 and an accessory gearbox (AGB) 42. The ATS 40 can be a bi-directional ATS. As used herein, the term "bi-directional ATS" is an ATS that can have a first airflow in a first direction through a passage and, at separate time, a second airflow in a second direction through the passage. That is, during operation, the bi-directional ATS can have the first airflow at a first time or stage of operation, and the second airflow at a different time or different stage of operation. In other words, the first airflow and the second airflow are not simultaneous. The ATS 40 is selectively coupled to the engine drive shaft 21. The selective coupling can be between the ATS 40 and the AGB 42. That is, the AGB 42 can selectively couples the ATS 40 and the engine drive shaft 21. Optionally, the AGB 42 can include one or more clutch assemblies to selectively couple the ATS 40 and the engine drive shaft 21. One or more additional shafts 44 couples the AGB 42 to the engine drive shaft 21. Optionally, a transfer gearbox, mechanical power take-off, beveled gears, or other connecting component 45 can couple to or be located between one or more portions of the one or more additional shafts 44, or between the AGB 42 and the engine drive shaft 21. While the ATS 40 is illustrated as the only accessory device coupled to the AGB 42, any number of accessory devices are contemplated.

The drive unit 20 can include a power source 46 and a drive shaft 48. The drive unit 20 selectively couples to the ATS 40. The drive shaft 48 can selectively provide rotational energy from the power source 46 to the ATS 40. While illustrated as exterior of a housing of the ATS 40, it is contemplated that one or more portions of the power source 46 can be coupled to the ATS 40. The power source 46 can be an electric motor or any device capable of providing a rotational output or output that can be translated to a rotational input for the ATS 40. The power source 46 can couple to one or more batteries or generators. One or more clutch assemblies can be used to selectively couple or uncouple the power source 46 or the drive shaft 48 from the ATS 40.

The air turbine starter assembly 18 and the drive unit 20 are illustrated, by way of example, as axially located in the fan section 32. However, one or more portions of the air turbine starter assembly 18, the drive unit 20, or both, can be axially located in the compression section 12, in the turbine section 16, or a combination thereof. It is also contemplated that while illustrated as located radially at the fan casing 34, the one or more portions of the air turbine starter assembly 18 or the drive unit 20 can be located radially closer to portions of the compression section 12, for example, in the engine core 11 of the turbine engine 10 or a fairing. Further, any location for the air turbine starter assembly 18 is contemplated where the ATS 40 can be coupled to the turbine engine 10. Further still, any location for the drive unit 20 is contemplated where the drive unit 20 can be rotatably coupled to the ATS 40.

During start-up of the turbine engine 10, the ATS 40 is selectively coupled to the engine drive shaft 21 by the AGB 42. By way of non-limiting example, the ATS 40 receives pressurized air which it translates into rotational energy. The ATS 40 then provides a rotatable output via the AGB 42 that drives the engine drive shaft 21. The engine drive shaft 21 then rotates one or more portions of the fan section 32, the compression section 12, or the turbine section 16 to draw air into the turbine engine 10, where it is subsequently compressed and combusted. Once the ATS 40 initiates self-sustaining combustion or "normal running" operating conditions of the turbine engine 10, the ATS 40 is selectively uncoupled from the engine drive shaft 21.

During operation or normal running of the turbine engine 10, ambient or atmospheric air is drawn into the compression section 12 via the fan section 32 upstream of the compression section 12, where the air is compressed by the compression section 12 and defines a pressurized airflow within the engine core 11. The pressurized airflow can then flow into the combustion section 14 where the pressurized air is mixed with fuel and ignited, thereby generating combustion gases. Some work is extracted from these combustion gases by the HP turbine 28, which drives the HP compressor 26. The combustion gases are discharged into the LP turbine 30, which extracts additional work to drive the LP compressor 24, and the exhaust gas is ultimately discharged from the turbine engine 10 via an exhaust section downstream of the turbine section 16. The driving of the LP turbine 30 drives at least the engine drive shaft 21 or the LP drive shaft 23, the fan 33, and the LP compressor 24. The pressurized airflow and the combustion gases can together define a working airflow that flows through the fan section 32, compression section 12, combustion section 14, and turbine section 16 of the turbine engine 10.

Prior to normal running of the turbine engine 10 or after the normal running of the turbine engine 10, the power source 46 can selectively couple to the ATS 40 and provide rotational energy to the ATS 40. The ATS 40 can then supply compressed air to one or more portions of the turbine engine 10 to cool one or more portions of the turbine engine 10, as described in further detail herein.

Figure 2:
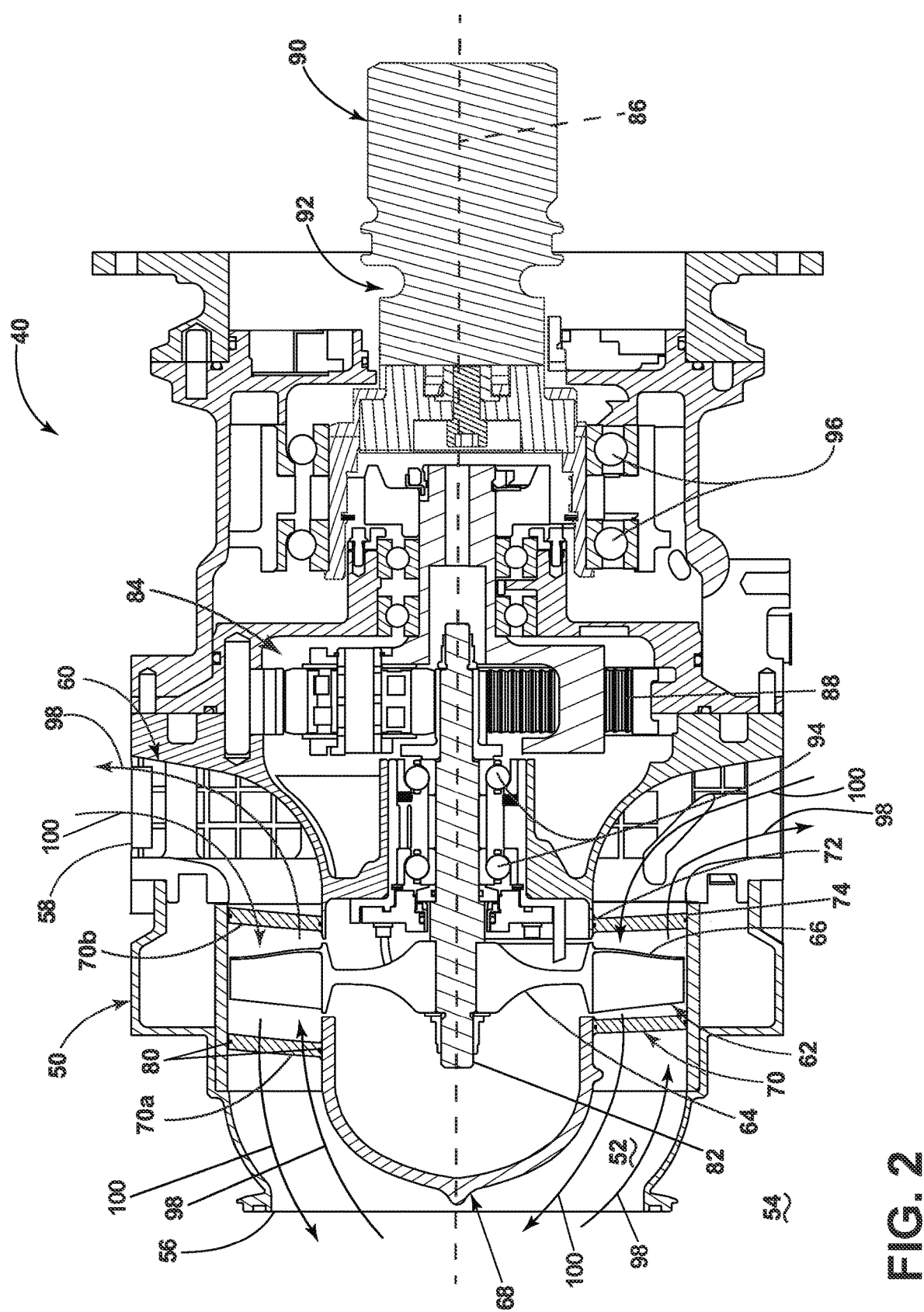
FIG. 2 is a schematic cross section of an air turbine starter of the air turbine starter assembly of FIG. 1, in accordance with various aspects described herein.

FIG. 2 is a schematic cross section of an exemplary air turbine starter 40 that can, for example, be included in the embodiment of FIG. 1. Generally, the ATS 40 includes a housing 50 defining an interior 52 and an exterior 54 of the housing 50. A first opening 56 and a second opening 58 are also defined by the housing 50. An air flow passage 60 extends between the first opening 56 and the second opening 58. That is, the air flow passage 60 fluidly couples the first opening 56 and the second opening 58, where the air flow passage 60 is at least partially defined by the housing 50.

The housing 50 can be formed in any suitable manner including, but not limited to, that it can be made up of two or more parts that are joined or otherwise coupled together or can be integrally formed as a single piece.

A turbine 62 is located within the interior 52 of the housing 50. The turbine 62 includes a rotor portion 64 and a plurality of circumferentially spaced blades 66. At least a portion of the turbine 62 is disposed within the air flow passage 60. The plurality of circumferentially spaced blades 66 located within the air flow passage 60.

A stator 68 can be located in the interior 52 of the housing 50. The stator 68 can at least partially define the air flow passage 60. The stator 68 can be coupled to or formed with the housing 50.

A plurality of circumferentially spaced vanes 70 extend into the air flow passage 60. The plurality of circumferentially spaced vanes 70 can include a first set of circumferentially spaced vanes 70*a*. The first set of circumferentially spaced vanes 70*a* can extend from the stator 68 into the air flow passage 60. Optionally, the first set of circumferentially spaced vanes 70*a* can extend across the air flow passage 60 from the stator 68 to the housing 50. The first set of circumferentially spaced vanes 70*a* can be located axially between the first opening 56 and the turbine 62. That is, the first set of circumferentially spaced vanes 70*a* can be axially forward of the turbine 62.

While illustrated as a single row of circumferentially spaced vanes, it is contemplated that the first set of circumferentially spaced vanes 70*a* can include multiple axially spaced rows of circumferentially spaced vanes.

A second set of circumferentially spaced vanes 70*b* can extend across the air flow passage 60. The second set of circumferentially spaced vanes 70*b* can extend between a radially inner portion 72 of the housing 50 and a radially outer portion 74 of the housing 50. The second set of circumferentially spaced vanes 70a can be located axially between the turbine 62 and the second opening 58. That is, the second set of circumferentially spaced vanes 70b can be axially aft of the turbine 62.

While illustrated as a single row of circumferentially spaced vanes, it is contemplated that the second set of circumferentially spaced vanes 70b can include multiple axially spaced rows of circumferentially spaced vanes.

The plurality of circumferentially spaced vanes 70 can include one or more adjustable portions 80. The one or more adjustable portions 80 can include, by way of non-limiting example, a rotatably pivotable point or a linearly adjustable portion.

That is, the first set of circumferentially spaced vanes 70a or the second set of circumferentially spaced vanes 70b can include a plurality of variable vanes. The first set of circumferentially spaced vanes 70a or the second set of circumferentially spaced vanes 70b that are variable vanes can couple to one or more accessory elements. By way of non-limiting example, the one or more accessory elements can include one or more of an actuator, lever arm, unison ring, bell crank, torque tubes, vertical link, clevis, or servo.

An ATS drive shaft 82 is coupled to the rotating turbine 62 so that the ATS drive shaft 82 can provide a rotational output from the turbine 62, such as to the AGB 42 or the engine drive shaft 21 (FIG. 1). Optionally, the ATS drive shaft 82 can provide a rotatable input to the turbine 62. A gear assembly 84 is coupled to the ATS drive shaft 82. The turbine 62, the ATS drive shaft 82, a portion of the gear assembly 84, or a combination thereof, can rotate about an axis of rotation 86.

The gear assembly 84 can include a gear train 88. The ATS 40 includes an output shaft 90 and a decoupler 92. The output shaft 90 can be operably coupled to the turbine 62 via the gear assembly 84 including the gear train 88 and the decoupler 92.

The output shaft 90 is selectively coupled to a portion of the turbine engine 10 (FIG. 1) such that the output shaft 90 can rotate a portion of the turbine engine 10. It is contemplated that the output shaft 90 is operably coupled to one or more portions of the compression section 12 (FIG. 1), the turbine section 16 (FIG. 1), or the compression section 12 (FIG. 1) and the turbine section 16 (FIG. 1).

A first bearing assembly 94 rotatably supports the ATS drive shaft 82. Optionally, a second bearing assembly 96 can rotatably support the ATS drive shaft 82, the output shaft 90, or both the ATS drive shaft 82 and the output shaft 90. The second bearing assembly 96 can be located aft of the first bearing assembly 94. By way of non-limiting example, the second bearing assembly 96 can be provided adjacent the gear train 88, the gear assembly 84, or combination thereof.

A starting flow path 98 is illustrated by arrows showing fluid flowing through the air flow passage 60 in a first direction. The starting flow path 98 in the first direction includes flowing fluid into the first opening 56 and through the air flow passage 60, where the fluid flow exits the housing 50 at the second opening 58.

A cooling flow path 100 is illustrated by arrows showing fluid flowing through the air flow passage 60 in a second direction, opposite of the first direction. The cooling flow path 100 in the second direction includes flowing fluid into the second opening 58 and through the air flow passage 60, where the fluid flow exits the housing 50 at the first opening 56.

The starting flow path 98 and the cooling flow path 100, while both illustrated in FIG. 2, do not occur simultaneously. As detailed below, during start-up of the turbine engine 10 (FIG. 1), the ATS 40 experiences an airflow traveling the starting flow path 98 in the first direction. Once the turbine engine 10 (FIG. 1) reaches normal running conditions, the airflow along the starting flow path 98 ceases. During landing or during maintenance, the ATS 40 experiences an airflow traveling the cooling flow path 100 in the second direction.

Figure 3:
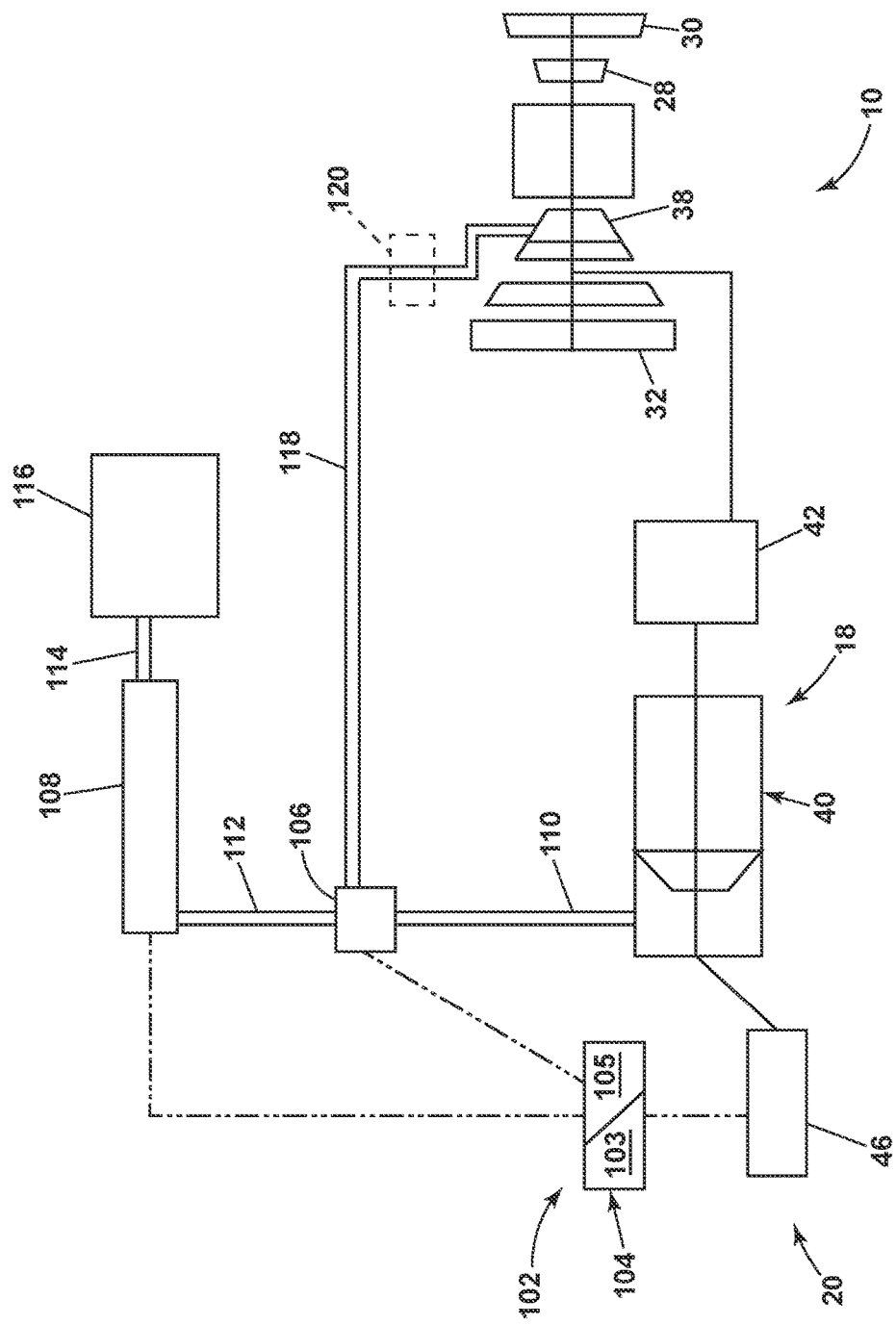
FIG. 3 is a schematic block diagram of a fluid control assembly interfacing with the turbine engine, the air turbine assembly, and the drive unit of FIG. 1, in accordance with various aspects described herein.

FIG. 3 is a schematic block diagram of the turbine engine 10 illustrating a fluid control assembly 102 coupled to or in communication with one or more components of the air turbine starter assembly 18 and the drive unit 20.

The fluid control assembly 102 includes a controller 104 in communication with at least one selective fluid coupling device, illustrated as a valve 106. While the valve 106 is illustrated as a single valve, the valve 106 can include any number of components or devices that can selectively control air flow through one or more conduits. The valve 106 can be, for example, a three-way valve or a four-way valve. It is also contemplated that the valve 106 can be multiple valves.

As illustrated, by way of non-limiting example, the controller 104 can be in communication with a starter air valve (SAV) 108, that can be included in the air turbine starter assembly 18, and the power source 46 of the drive unit 20. While illustrated as spaced from the drive unit 20 or the air turbine starter assembly 18, it is contemplated that the controller 104 can be coupled to or housed within, for example, the power source 46, the ATS 40, or the valve 106.

The controller 104 can include a processor 103 and a memory 105. For example, the memory 105 can store code, executable instructions, commands, instructions, authorization keys, specialized data keys, passwords, or the like. The memory 105 can be RAM, ROM, flash memory, or one or more different types of portable electronic memory, such as discs, DVDs, CD-ROMs, etc., or any suitable combination of these types of memory. The processor 103 can be defined as a portion of the controller 104 which can receive an input, perform calculations, and output executable data. The processor 103 can be a microprocessor. It is also contemplated that the controller 104 can be part of or in communication with a flight management system (FMS).

A first conduit 110 fluidly couples the ATS 40 and the valve 106. For example, the first conduit 110 fluidly couples the first opening 56 (FIG. 2) of the ATS 40 and the valve 106.

Optionally, a second conduit 112 fluidly couples the valve 106 to the SAV 108. While illustrated as spaced from one another, it is contemplated that the valve 106 and the SAV 108 can be coupled or otherwise located in the same housing unit.

A third conduit 114 fluidly couples the SAV 108 to a pressurized air source 116. The pressurized air source 116 can be a ground-operating air cart, an auxiliary power unit, or a cross-bleed start from an engine already operating, among other sources.

A fourth conduit 118 fluidly couples the valve 106 and one or more portions of the turbine engine 10. While illustrated as fluidly coupled to the HP compressor 26, it is contemplated that the fourth conduit 118 could fluidly couple the first opening 56 (FIG. 2) of the ATS 40 and one or more portions or combinations of the fan section 32, the LP compressor 24, the HP compressor 26, the HP turbine 28, or the LP turbine 30.

The fourth conduit 118 can provide air to one or more sets of circumferentially spaced blades. By way of non-limiting example, the fourth conduit 118 can provide air to the set of circumferentially spaced blades 38. The air provided or flowing to the set of circumferentially spaced blades 38 can rotate or assist in rotating the set of circumferentially spaced blades 38.

Optionally, an additional fluid assembly 120 can be located in, coupled to, or replace the fourth conduit 118 to control the air flow between the valve 106 and one or more portions of the turbine engine 10. The additional fluid assembly 120 can include, by way of non-limiting example, one or more of a valve, a sensor, a conduit, a manifold, a set of tubes optionally feeding the manifold, a flow nozzle, a bleed valve, an ambient air or bleed air inlet, or an outlet fluidly coupled with the ambient air.

While the first, second, third, and fourth conduits 110, 112, 114, 118 are illustrated as single conduits, any of the first, second, third, or fourth conduits 110, 112, 114, 118 can include any number of conduits and/or other air flow control devices or sensors.

While the illustrated as closed, it is contemplated that the valve 106, the first, second, third, fourth conduits 110, 112, 114, 118, or the additional fluid assembly 120 can fluidly couple with one or more air systems. The air systems can include, but not limited to, a bleed air system that can, for example, draw air from one or more portions of the compression section 12, or another air system that can, for example, air drawn in at or near the nacelle. It is contemplated that any number of conduits, valves or other air control components fluidly couple to or are controlled by one or more portions or components of the fluid control assembly 102 for fluidly coupling to the one or more air systems.

Figure 4:
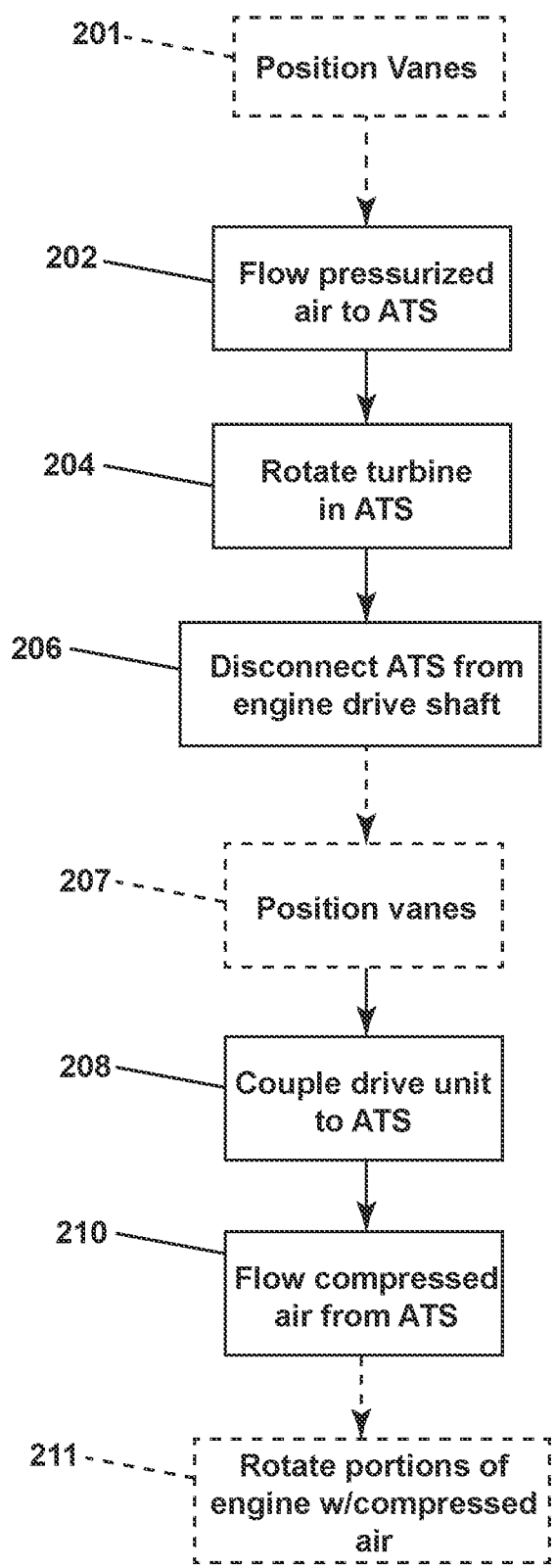
FIG. 4 is a method of operating a turbine engine in accordance with various aspects described herein.

FIG. 4 is a method 200 of operating the turbine engine 10 including the ATS 40 of FIGS. 1-3. The method 200 includes starting the turbine engine 10, followed by shutting the turbine engine 10 down. It is contemplated that other process can occur between the starting the turbine engine 10 and the shutting down the of the turbine engine 10. Reference will be made to FIGS. 1-3 by relating the method 200 to the physical aspects of the turbine engine 10 of FIG. 1, the ATS 40 of FIG. 2 and the fluid control assembly 102, the air turbine starter assembly 18, and the drive unit 20 of FIG. 3.

Optionally, at 201, one or more of the plurality of circumferentially spaced vanes 70 are adjusted or positioned. By way of example, the one or more adjustable portions 80 of one or more vanes of the first set of circumferentially spaced vanes 70a or the second set of circumferentially spaced vanes 70b are pivoted or otherwise varied to position the first set of circumferentially spaced vanes 70a, the second set of circumferentially spaced vanes 70b, or any combination therein, into a predetermined starting position. The predetermined starting position provides guidance to the pressurized air flow provided at the first opening 56 and flowing in the first direction to rotate the turbine 62 in a first rotational direction.

At 202, in a start-up mode, pressurized air flows to the ATS 40. For example, the pressurized air source 116 is fluidly coupled to provide pressurized air to the first opening 56 of the ATS 40 by way of at least the SAV 108 and the valve 106.

By way of non-limiting example, the pressurized air source 116 can flow pressurized air to the SAV 108 through the third conduit 114. The controller 104 can position the SAV 108 to allow the pressurized air from the pressurized air source 116 to the valve 106, for example, through the second conduit 112. The SAV 108 regulates the flow of pressurized air from the pressurized air source 116 to the ATS 40.

The controller 104 can further position the valve 106 to allow the pressurized air to flow to the ATS 40. For example, the controller 104 can further position the valve 106 to allow the pressurized air to flow through the first conduit 110 and into the first opening 56 of the ATS 40. The pressurized air received at the first opening 56 flows along the starting flow path 98 in the first direction. That is, the controller 104 selectively fluidly couples the ATS 40 to the pressurized air source 116 when air is flowing through the starting flow path 98.

At 204, the turbine 62 is rotated by the pressurized air flowing through the air flow passage 60 in the first direction. The turbine 62 rotatably extracts mechanical power from the flow of pressurized air along the starting flow path 98. The AGB 42 selectively connects the turbine 62 to the engine drive shaft 21 when air is flowing through the starting flow path 98. For example, the ATS drive shaft 82 that is rotatably coupled the turbine 62 provides a rotational output to the AGB 42. The AGB 42 then transfers the rotatable output from the ATS 40 to the engine drive shaft 21. The selective connection between the AGB 42 and the ATS drive shaft 82 can be controlled by a clutch assembly at the AGB 42 and/or the decoupler 92 of the ATS 40.

At 206, the ATS 40 is selectively uncoupled or disconnected from the engine drive shaft 21 once the turbine engine 10 reaches initiated self-sustaining combustion. One or more sensors can detect torque, rotational speed, or both, of the engine drive shaft 21, the ATS drive shaft 82, or both. Once a predetermined torque, rotational speed, or both is reached, the decoupler 92 can disconnect the ATS drive shaft 82 from the AGB 42.

The decoupling of the ATS 40 from the engine drive shaft 21 is indictive of the end of the start-up mode, when the turbine engine 10 reaches a self-sustaining state. The turbine engine 10 can participate in a cycle of operation or run for a predetermined time. Once fuel is no longer provided to the combustor, combustion ceases and the turbine engine 10 shuts down or is considered in a shut-down mode. It is important to note that one or more portions of the turbine engine 10 can rotate during the shut-down mode.

Optionally, prior to during the shut-down mode of the turbine engine 10, at 207, one or more of the plurality of circumferentially spaced vanes 70 of the ATS 40 are adjusted or positioned. By way of example, the one or more adjustable portions 80 of one or more vanes of the first set of circumferentially spaced vanes 70a or the second set of circumferentially spaced vanes 70b are pivoted or otherwise varied to position the first set of circumferentially spaced vanes 70a, the second set of circumferentially spaced vanes 70b, or any combination therein, into a predetermined shutdown position. The predetermined shutdown position provides guidance or compression to the ambient air drawn in by the rotation of the turbine 62 in a second rotational direction, opposite of the first rotational direction of start-up.

While the turbine engine 10 begins or is in the shut-down mode, at 208, the drive unit 20 selectively connects to the turbine 62 to rotate the turbine 62. That is, the power source 46 can selectively couple to the ATS 40 to provide rotational energy to the ATS 40. As used herein, shutdown of the turbine engine 10 refers to a time when combustion has ceased.

After shutdown of the turbine engine 10, power source 46 can provide a rotational output to the drive shaft 48. The drive shaft 48, being selectively coupled to the ATS 40, rotates the ATS drive shaft 82. The drive shaft 48 rotates the ATS drive shaft 82, and therefore the turbine 62, in a direction opposite that of the rotation used during start-up or 204.

The turbine 62, being rotated by the selective coupling of the drive unit 20, draws ambient air into the second opening 58 of the ATS 40. The air flows along the cooling flow path 100 in the second direction. As the ambient air encounters the plurality of circumferentially spaced vanes 70 and the turbine 62, the ambient air becomes a compressed air flow, exiting the ATS 40 at the first opening 56.

At 210, the compressed air flow from the ATS 40 flows to one or more portions of the turbine engine 10. That is, compressed air flowing from the first opening 56 of the ATS 40, when the ATS 40 is powered by the power source 46, can enter the first conduit 110.

The controller 104 can communicate with or position the valve 106 such that the compressed air from the first conduit 110 can flow into the fourth conduit 118. In other words, the fluid control assembly 102 or the controller 104 selectively fluidly couples the ATS 40 to one or more portions of the turbine engine 10 when air is flowing through the cooling flow path 100.

The compressed air from the fourth conduit 118 can be delivered to one or more portions of the turbine engine 10. Examples of portions of the turbine engine 10 that can receive the compressed air include, but are not limited to, the fan section 32, the compression section 12, or the turbine section 16. It is contempered that the additional fluid assembly 120 can control, monitor, or both, the flow of compressed air from the valve 106 to the turbine engine 10.

Optionally, at 212, the compressed air flow provided or flowing to the one or more portions of the turbine engine 10 rotates one or more components of the turbine engine 10. That is, the compressed air, when provided to the turbine engine 10, can rotate one or more blades such as the set of circumferentially spaced blades 38 in the compression section 12 or the set of circumferentially spaced blades 39 in the turbine section 16. The rotation of the one or more of the sets of circumferentially spaced blades 38, 39 causes the turbine engine 10 to draw in ambient air that can cool engine core components.

During the shut-down mode the compressed air from the ATS 40 can maintain rotation at a predetermined speed of the one or more of the sets of circumferentially spaced blades 38, 39. Alternatively, the compressed air from the ATS 40 can be applied to one or more of the stationary sets of circumferentially spaced blades 38, 39 to rotate them at a predetermined speed.

By way of non-limiting example, pressurized air from the ATS 40, illustrated as the cooling flow path 100, can be directed to one or more of the sets of circumferentially spaced blades 38, 39 such that focused impingement can rotate the set of circumferentially spaced blades 38, and/or the set of circumferentially spaced blades 39, causing the engine drive shaft 21 to rotate. The turbine engine 10, upon rotation of the engine drive shaft 21, will draw in ambient air and flow the ambient air through the fan section 32, the compression section 12, the combustion section 14, and the turbine section 16. This ambient air drawn in as the result of the rotation of the engine drive shaft 21 by the compressed air can cool components of the compression section 12, the combustion section 14, the turbine section 16, or any combination therein. That is, when the pressurized air from the ATS 40 impinges on at least one set of the plurality of circumferentially spaced blades 38, 39 of the engine core 11 in such a way that causes the rotation of one or more portions of the engine drive shaft 21, a large volume of external or ambient air is drawn into the engine core 11.

In a different and non-limiting example, additionally to the impingement and rotation of the engine core 11, the pressurized air from the ATS 40 provided at the at least one set of the plurality of circumferentially spaced blades 38, 39 or one or more portions of the engine core 11 can be used as a cooling air flow provided to one or more components of the engine core 11. That is, the pressurized air from the ATS 40 received by the turbine engine 10 or the engine core 11 can be used to cool one or more components of the turbine engine 10 or the engine core 11 and rotate one or more portions of the engine drive shaft 21.

In yet another different and non-limiting example, the pressurized air from the ATS 40 received by the turbine engine 10 or the engine core 11 can be used to cool one or more components of the turbine engine 10 or the engine core 11 without rotating one or more portions of the engine drive shaft 21. This provides the benefit of cooling one or more components of the turbine engine 10 or the engine core 11 without needing lubrication systems required for rotation of one or more portions of the engine drive shaft 21.

Figure 5:
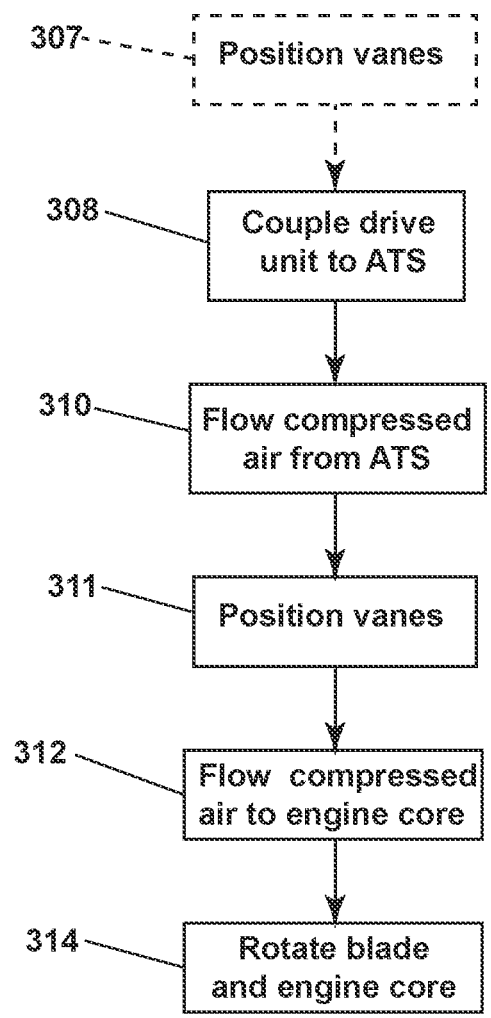
FIG. 5 is another method of operating a turbine engine in accordance with various aspects described herein.

FIG. 5 is a method 300 of operating the turbine engine 10 including the ATS 40 of FIGS. 1-3. Reference will be made to FIGS. 1-3 by relating the method 200 to the physical aspects of the turbine engine 10 of FIG. 1, the ATS 40 of FIG. 2 and the fluid control assembly 102, the air turbine starter assembly 18, and the drive unit 20 of FIG. 3.

The method 300 is similar to the method 200, with it being understood that the description of the like parts of the method 200 applies to the method 300 unless otherwise noted.

The method 300 is a method of operating the turbine engine 10 after shutdown of the turbine engine 10 or during maintenance of the turbine engine 10.

Optionally, at 307, one or more of the plurality of circumferentially spaced vanes 70 of the ATS 40 are adjusted or positioned.

At 308 the power source 46 is selectively coupled to the ATS 40 to rotate the ATS drive shaft 82. The turbine 62, being rotated by the power source 46, draws ambient air into the second opening 58 of the ATS 40. The air flows along the cooling flow path 100 in the second direction. As the ambient air encounters the plurality of circumferentially spaced vanes 70 and the turbine 62, the ambient air becomes a compressed air flow, exiting the ATS 40 at the first opening 56.

At 310, the compressed air flow from the ATS 40 flows to one or more portions of the turbine engine 10. That is, compressed air flowing from the first opening 56 of the ATS 40, when the ATS 40 is powered by the power source 46, enters the first conduit 110.

At 311, the controller 104 can communicate with or position the valve 106 such that the compressed air from the first conduit 110 can flow into one or more portions of the engine core 11.

At 312, the compressed air flow provided or flowing to the one or more portions of the engine core 11 can cool components of the engine core 11 and/or rotate one or more components of the turbine engine 10.

At 314, if the compressed air flow rotates one or more components of the turbine engine 10, ambient air flows through the compression section 12, the combustion section 14, and the turbine section 16 as a result of the compressed air rotating one or more of the circumferentially spaced blades 38, 39 in the compression section 12 or the turbine section 16. The ambient air and/or the compressed air flow cools components of the turbine engine 10.

The rotation of the engine drive shaft 21 by the application of the compressed air from the ATS 40 can also lengthen the time between engine shutoff and engine stop. As used herein "engine stop" refers to the state in which the rotating components of the turbine engine 10 cease rotating. This increase in time before stopping, or coming to rest, can allow for both better cooling of components and a more gradual stop from rotation can length part life.

The controller 104 can implement some or all portions of the method 200 (FIG. 4) the method 300, or both the method 200 (FIG. 4) and the method 300.

Benefits of the present disclosure include an increased cooling efficiency of the engine when compared to a conventional engine. For example, the conventional engine can require off-board system to cool the conventional engine after shutdown of the conventional engine. The engine, as described herein, however, can utilize the power source (electric motor) to supply a flow of cooling fluid from the bi-directional ATS to the engine core and thus cool the engine core. This greatly increases the cooling efficiency of the engine when compared to the conventional engine. Further, the use of the bi-directional ATS to both start the turbine engine and operate as a compressor unit to provide a compressed air flow to the engine after shutoff can be a weight savings.

Additional benefits of the present disclosure include a decreased burden of maintenance of the engine or the ATS when compared to a conventional ATS or a conventional engine. For example, maintenance of the conventional ATS or the conventional engine can require disassembling the conventional ATS or the conventional engine and visually inspecting various components of the conventional ATS or the conventional engine. Another option is that one or more additional pieces of equipment can be coupled to the conventional ATS or the conventional engine to try to rotate one or more portions of the conventional ATS or the conventional engine.

The air turbine starter, as described herein, however, can utilize the power source (electric motor) to drive the ATS drive shaft such that maintenance requiring the rotation of the ATS or the turbine engine can be performed without additional equipment or the removal of portions of the turbine engine or the ATS.

Yet another benefit of the present disclosure can be providing a cooling air flow to one or more portions of the turbine engine or the engine core without rotating one or more portions of the turbine engine. This provides the benefit of cooling one or more components of the turbine engine or the engine core without needing lubrication systems required for rotating portions of the turbine engine.

Still yet another benefit of the present disclosure is improved uniform cooling of one or more components. For example, uniform circumferential cooling of rotating portions of the turbine engine can length the part life. The uniform cooling can reduce possible wear from movement or bowing caused by heat and/or non-uniform cooling.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A turbine engine comprising an engine core having a compression section, a combustion section, and a turbine section in serial flow arrangement, the engine core having an engine drive shaft, an air turbine starter comprising a housing defining an air flow passage, and a turbine having a plurality of circumferentially spaced blades located within the air flow passage, a gearbox selectively connecting the turbine to the engine drive shaft when the air turbine starter is operable in a start-up mode in which air is provided to the air turbine starter and flows through the air flow passage in a first direction to cause the turbine to rotate, and a drive unit selectively connecting to the turbine to rotate when the air turbine starter is operable in a shut-down mode in which the drive unit drives the turbine to provide air through the air flow passage in a second direction, wherein the air from the air turbine starter is provided to at least one of the compression section or the turbine section.

The turbine engine of any preceding clause, further comprising a fluid control assembly having a controller for selectively fluidly coupling the air turbine starter to a pressurized air source when the air turbine starter is in the start-up mode, or to one or more portions of the turbine engine the air turbine starter is in the shut-down mode.

The turbine engine of any preceding clause, wherein the drive unit includes a power source operably coupled to a drive shaft, wherein the drive shaft is selectively coupled to the turbine.

The turbine engine of any preceding clause, wherein the power source is located exterior of the housing of the air turbine starter.

The turbine engine of any preceding clause, further comprising at least one conduit fluidly coupling a first opening of the air turbine starter to a high-pressure compressor of the compression section or a high-pressure turbine of the turbine section.

The turbine engine of any preceding clause, further comprising a first set of circumferentially spaced vanes located forward of the turbine and a second set of circumferentially spaced vanes located aft of the turbine.

The turbine engine of any preceding clause, wherein the first set of circumferentially spaced vanes, the second set of circumferentially spaced vanes, or combination therein, include one or more variable vanes.

A turbine engine comprising an engine core having a compression section, combustion section, and turbine section in serial flow arrangement, the engine core having an engine drive shaft, a bi-directional air turbine starter having a housing defining a first opening, a second opening, and an air flow passage extending between the first opening and the second opening, the bi-directional air turbine starter selectively coupled to the engine drive shaft, a drive unit having a power source operably coupled to a drive shaft, wherein the drive shaft is selectively coupled to the bi-directional air turbine starter, and a fluid control assembly selectively fluidly coupling the first opening of the bi-directional air turbine starter to one or more portions of the engine core.

The turbine engine of any preceding clause, wherein the fluid control assembly comprises at least one conduit fluidly coupling the first opening to a high-pressure compressor of the compression section or a high-pressure turbine of the turbine section.

The turbine engine of any preceding clause, wherein the power source includes an electric motor.

The turbine engine of any preceding clause, further comprising a controller in communication with a valve of the fluid control assembly.

The turbine engine of any preceding clause, wherein when the bi-directional air turbine starter is selectively coupled to the engine drive shaft, an air turbine starter drive shaft rotates in a first direction.

The turbine engine of any preceding clause, wherein when the bi-directional air turbine starter is selectively coupled to the engine drive shaft, compressed air flows from the first opening to the second opening.

The turbine engine of any preceding clause, wherein when the bi-directional air turbine starter is selectively coupled to the power source, the air turbine starter drive shaft rotates in a second direction.

The turbine engine of any preceding clause, wherein when the bi-directional air turbine starter is selectively coupled to the power source, compressed air flows from the second opening to the first opening.

The turbine engine of any preceding clause, wherein the bi-directional air turbine starter includes an air turbine starter when selectively coupled to the engine drive shaft, and the bi-directional air turbine starter is a compressor when selectively coupled to the power source.

A method of operating a turbine engine comprising in a start-up mode, flowing pressurized air in a first direction through an air turbine starter to rotate a turbine of the air turbine starter, which is operably coupled to an engine drive shaft of the turbine engine, to affect a rotation of the engine drive shaft by rotating the turbine, and in a shut-down mode, rotatably driving the turbine of the air turbine starter to generate a pressurized air flow flowing in a second direction, opposite the first direction, through the air turbine starter, and supplying the pressurized air flow from the air turbine starter to the turbine engine.

The method of any preceding clause, wherein the pressurized air flow from the air turbine starter during the shut-down mode is provided to one or more blades in a high-pressure compressor.

The method of any preceding clause, further comprising adjusting one or more variable vanes between the start-up mode and the shut-down mode.

The method of any preceding clause, further comprising rotating one or more blades of a high-pressure compressor or a high-pressure turbine, at least in part, with the pressurized air flow.

The method of any preceding clause, further comprising rotating one or more blades of a high-pressure compressor and a high-pressure turbine, at least in part, with the pressurized air flow.

What is claimed is:

1. A turbine engine comprising:
    an engine core having a compression section, a combustion section, and a turbine section in serial flow arrangement, the engine core having an engine drive shaft;
    an air turbine starter comprising:
        a housing defining an air flow passage extending between a first opening and a second opening; and
        a turbine having a plurality of circumferentially spaced blades located within the air flow passage;
    a set valves;
    a first conduit extending from the set of valves and to the first opening;
    a second conduit extending from the set of valves and to the engine core;
    a gearbox selectively connecting the turbine to the engine drive shaft when the air turbine starter is operable in a start-up mode in which air is provided to the air turbine starter through the first opening via the first conduit and at least one valve of the set of vales such that the air flows through the air flow passage in a first direction to cause the turbine to rotate; and
    a drive unit selectively coupled to the turbine, the drive unit configured to rotate the turbine during a shut-down mode in order to draw in air through the second opening and into the air flow passage in a second direction, opposite the first direction, wherein the air drawn in through the second opening during the shut-down mode flows through the first opening, the first conduit, at least one valve of the set of valves, the second conduit and is fed to at least one of the compression section or the turbine section.

2. The turbine engine of claim 1, further comprising a fluid control assembly having a controller for selectively fluidly coupling the air turbine starter to a pressurized air source when the air turbine starter is in the start-up mode through at least one valve of the set of valves and the first conduit, or to one or more portions of the turbine engine when the air turbine starter is in the shut-down mode through at least one valve of the set of valves, the first conduit and the second conduit.

3. The turbine engine of claim 1, wherein the drive unit includes a power source operably coupled to a drive shaft, wherein the drive shaft is selectively coupled to the turbine.

4. The turbine engine of claim 3, wherein the power source is located exterior of the housing of the air turbine starter.

5. The turbine engine of claim 1, further comprising at least one conduit fluidly coupling the first opening of the air turbine starter to a high-pressure compressor of the compression section or a high-pressure turbine of the turbine section.

6. The turbine engine of claim 1, further comprising a first set of circumferentially spaced vanes located forward of the turbine and a second set of circumferentially spaced vanes located aft of the turbine.

7. The turbine engine of claim 6, wherein the first set of circumferentially spaced vanes, the second set of circumferentially spaced vanes, or combination therein, include one or more variable vanes.

8. A turbine engine comprising:
    an engine core having a compression section, a combustion section, and a turbine section in serial flow arrangement, the engine core having an engine drive shaft;

a bi-directional air turbine starter having a housing defining a first opening, a second opening, and an air flow passage extending between the first opening and the second opening, the bi-directional air turbine starter selectively coupled to the engine drive shaft;

a drive unit having a power source operably coupled to a drive shaft, wherein the drive shaft is selectively coupled to the bi-directional air turbine starter;

a set of valves; and a fluid control assembly selectively fluidly coupling the first opening of the bi-directional air turbine starter to one or more portions of the engine core, the fluid control assembly comprising a controller in communication with the set of valves and having a processor and a memory, the processor of the controller configured to:

in a start-up mode selectively operate at least one valve of the set of valves to direct a flow of pressurized air into the bi-directional air turbine starter through the first opening such that the flow of pressurized air flows in a first direction through the air flow passage; and in a shut-down mode selectively operate at least one valve of the set of valves to direct a flow of ambient air into the bi-directional air turbine starter through the second opening such that the flow of ambient air flows in a second direction, opposite the first direction, through the air flow passage, out the first opening and to the one or more portions of the engine core.

9. The turbine engine of claim 8, wherein the fluid control assembly comprises at least one conduit fluidly coupling the first opening to a high-pressure compressor of the compression section or a high-pressure turbine of the turbine section.

10. The turbine engine of claim 8, wherein the power source includes an electric motor.

11. The turbine engine of claim 8, wherein when the bi-directional air turbine starter is selectively coupled to the engine drive shaft, an air turbine starter drive shaft rotates in a first direction.

12. The turbine engine of claim 11, wherein when the bi-directional air turbine starter is selectively coupled to the engine drive shaft, compressed air flows from the first opening to the second opening.

13. The turbine engine of claim 11, wherein when the bi-directional air turbine starter is selectively coupled to the power source, the air turbine starter drive shaft rotates in a second direction.

14. The turbine engine of claim 8, wherein the bi-directional air turbine starter is an air turbine starter when selectively coupled to the engine drive shaft, and the bi-directional air turbine starter is a compressor when selectively coupled to the power source.

* * * * *